United States Patent
Parsons et al.

(10) Patent No.: US 11,329,723 B2
(45) Date of Patent: *May 10, 2022

(54) O-BAND OPTICAL COMMUNICATION SYSTEM WITH DISPERSION COMPENSATION

(71) Applicant: COMMSCOPE TECHNOLOGIES LLC, Hickory, NC (US)

(72) Inventors: Earl Ryan Parsons, Allen, TX (US); Richard Y. Mei, Parker, TX (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/078,921

(22) Filed: Oct. 23, 2020

(65) Prior Publication Data
US 2021/0044355 A1     Feb. 11, 2021

Related U.S. Application Data

(63) Continuation of application No. 16/327,545, filed as application No. PCT/US2017/047978 on Aug. 22, 2017, now Pat. No. 10,819,433.
(Continued)

(51) Int. Cl.
*H04J 14/02* (2006.01)
*H04B 10/2525* (2013.01)

(52) U.S. Cl.
CPC ........ *H04B 10/25253* (2013.01); *H04J 14/02* (2013.01)

(58) Field of Classification Search
CPC ............................ H04B 10/25253; H04J 14/02
See application file for complete search history.

(56) References Cited

U.S. PATENT DOCUMENTS 5,701,188 A * 12/1997 Shigematsu ....... G02B 6/29317
                                                             398/148
5,854,871 A * 12/1998 Akasaka ............ G02B 6/03627
                                                             385/123
(Continued)

FOREIGN PATENT DOCUMENTS

CN          105356944 A      2/2016
EP          1 596 229 A1    11/2005
(Continued)

OTHER PUBLICATIONS

International Search Report and Written Opinion of the International Searching Authority for International Patent Application No. PCT/US2017/047978 dated Nov. 30, 2017, 8 pages.
(Continued)

*Primary Examiner* — Tanya T Motsinger
(74) *Attorney, Agent, or Firm* — Merchant & Gould P.C.

(57) ABSTRACT

An O-band optical communication system includes a transmitter, a receiver, and an optical fiber system coupled between the transmitter and the receiver. The optical fiber system includes at least a first fiber segment, with a positive dispersion-wavelength gradient and a first zero dispersion wavelength, coupled in series to a second fiber segment, with a negative dispersion-wavelength gradient and a second zero dispersion wavelength. When an optical signal propagating along the first fiber segment has a wavelength shorter than the first zero dispersion wavelength and experiences negative dispersion, at least partial positive dispersion compensation is provided by propagation along the second fiber segment. When light of the optical signal propagating along the first fiber segment has a wavelength longer than the first zero dispersion wavelength and experiences positive dispersion, at least partial negative dispersion compensation is provided by propagation along the second fiber segment.

16 Claims, 7 Drawing Sheets

Related U.S. Application Data (60) Provisional application No. 62/378,006, filed on Aug. 22, 2016.

(56) References Cited

U.S. PATENT DOCUMENTS

| | | | | |
|---|---|---|---|---|
| 6,021,235 | A * | 2/2000 | Yamamoto | H04B 10/2525 385/15 |
| 6,043,914 | A * | 3/2000 | Cook | H04B 10/2513 398/1 |
| 6,055,081 | A * | 4/2000 | Koyano | 398/147 |
| 6,163,398 | A * | 12/2000 | Inagaki | H04B 10/2942 359/337.5 |
| 6,178,279 | B1 * | 1/2001 | Mukasa | G02B 6/02004 385/123 |
| 6,424,773 | B1 * | 7/2002 | Watanabe | G02F 1/3519 385/122 |
| 6,519,402 | B2 * | 2/2003 | Aikawa | G02B 6/02009 385/123 |
| 6,583,907 | B1 * | 6/2003 | Essiambre | H04B 10/2519 398/141 |
| 6,608,854 | B1 * | 8/2003 | Watanabe | H01S 5/0608 372/31 |
| 6,865,328 | B2 * | 3/2005 | Berkey | G02B 6/02009 385/122 |
| 6,975,801 | B2 * | 12/2005 | Bickham | G02B 6/02009 385/123 |
| 6,980,738 | B1 * | 12/2005 | Frankel | H04B 10/2525 398/147 |
| 6,993,228 | B2 * | 1/2006 | Burke, Jr | G02B 6/02261 385/123 |
| 8,503,881 | B1 * | 8/2013 | Li | H04J 14/02 398/81 |
| 2002/0006257 | A1 * | 1/2002 | Danziger | H04B 10/25253 385/123 |
| 2002/0024720 | A1 * | 2/2002 | Onishi | H01S 3/302 359/334 |
| 2002/0102082 | A1 * | 8/2002 | Sarchi | G02B 6/02271 385/123 |
| 2002/0106148 | A1 * | 8/2002 | Schemmann | H04B 10/2507 385/24 |
| 2002/0164137 | A1 * | 11/2002 | Johnson | G02B 6/023 385/125 |
| 2003/0016438 | A1 * | 1/2003 | Islam | H01S 3/06754 359/334 |
| 2003/0031407 | A1 * | 2/2003 | Weisberg | G02B 6/02304 385/28 |
| 2003/0031440 | A1 * | 2/2003 | Dennis | H04B 10/2916 385/123 |
| 2003/0063860 | A1 * | 4/2003 | Watanabe | G02F 1/3519 385/39 |
| 2004/0184815 | A1 * | 9/2004 | Korolev | H04B 10/2525 398/148 |
| 2004/0218882 | A1 * | 11/2004 | Bickham | G02B 6/03666 385/127 |
| 2005/0089289 | A1 * | 4/2005 | Hayami | G02B 6/03688 385/127 |
| 2005/0175303 | A1 * | 8/2005 | Jang | G02B 6/02276 385/124 |
| 2008/0107426 | A1 * | 5/2008 | Bigot-Astruc | H04B 10/25253 398/159 |
| 2009/0046984 | A1 * | 2/2009 | Mukasa | G02B 6/29377 385/125 |
| 2009/0263091 | A1 * | 10/2009 | Kumano | G02B 6/02019 385/127 |
| 2009/0290879 | A1 * | 11/2009 | Schemmann | H04B 10/2537 398/81 |
| 2019/0349085 | A1 * | 11/2019 | Parsons | H04J 14/02 |

FOREIGN PATENT DOCUMENTS

| | | |
|---|---|---|
| WO | 2006/006749 A1 | 1/2006 |
| WO | 2018/039206 A1 | 3/2018 |

OTHER PUBLICATIONS

Extended European Search Report for corresponding European Patent Application No. 17844269.5 dated Apr. 22, 2020, 8 pages.

Ainslie, B. et al., "A Review of Single-Mode Fibers with Modified Dispersion Characteristics", Journal of Lightwave Technology, LT-4(8): 967-979 (1986).

Gruner-Nielsen, L. et al., "Dispersion-Compensating Fibers", Journal of Lightwave Technology, 23(11): 3566-3579 (2005).

Nunes, F. et al., "Design Considerations on a Dispersion Compensating Coaxial Fiber", Braz. J. Phys., 28(2): 1-6 (1998).

* cited by examiner

O-BAND OPTICAL COMMUNICATION SYSTEM WITH DISPERSION COMPENSATION

CROSS-REFERENCE TO RELATED APPLICATION

This application is a Continuation of U.S. patent application Ser. No. 16/327,545, filed on Feb. 22, 2019, which is a National Stage Application of PCT/US2017/047978, filed on Aug. 22, 2017, which claims the benefit of U.S. Patent Application Ser. No. 62/378,006, filed on Aug. 22, 2016, the disclosures of which are incorporated herein by reference in their entireties. To the extent appropriate, a claim of priority is made to each of the above disclosed applications.

BACKGROUND OF THE INVENTION

The present invention is generally directed to optical communications, and more specifically to optical communication systems and methods operating in the O-band and providing dispersion compensation.

Long-range optical communication systems, as may be used for telephone signals, internet and the like, typically operate in the C-band, between 1530-1565 nm, and especially around 1550 nm, in part because of the low attenuation of optical signals in typical silica-based optical fibers at that wavelength range. While attenuation is low at wavelengths around 1550 nm, dispersion in typical silica-based fibers in the C-band causes pulsed optical signals to spread: because the refractive index of the optical fiber is not constant as a function of wavelength, light at different wavelengths propagates through the fiber at different speeds. So-called "normal dispersion" typically corresponds to negative values, and represents longer wavelengths of an optical signal traveling relatively faster than shorter wavelengths. Conversely, "anomalous dispersion" typically corresponds to positive values, and represents longer wavelengths of an optical signal traveling relatively slower than shorter wavelengths. The term "dispersion" as used herein is the sum of waveguide dispersion and material dispersion. Such signal spreading, or dispersion, can cause a loss of signal fidelity and a reduction in bandwidth. Consequently, many long-haul optical communication systems operating in the C-band employ some kind of dispersion compensation to reduce spreading of the optical signal, thereby maintaining signal fidelity and bandwidth.

While long-range optical communication systems typically operate in the C-band, many shorter-range optical communication systems, operating over distances of around a hundred meters to tens of kilometers, operate in the O-band, between 1260-1360 nm. Optical attenuation in a typical silica-based optical fiber is higher for wavelengths in the O-band than in the C-band. On the other hand, typical silica-based fibers have less dispersion within the O-band than in the C-band and at a certain wavelength, typically around 1310 nm, demonstrate zero dispersion. Thus, optical communication systems operating around 1310 nm have not employed dispersion compensation techniques.

With increasing demands on the ability to transmit information, there is a need, therefore, to increase the bandwidth of optical signals being transmitted within O-band systems. Optical communication systems operating in the O-band have not employed dispersion compensation techniques due to the relatively low dispersion within the band. As data-rate and bandwidth requirements increase, however, it is increasingly desirable to compensate for dispersion in the O-band, for example at date rates of 25, 50, or 100 Gb/s. It is also desirable to increase the distance over which O-band communication systems can operate, to increase their applicability in various communications situations.

SUMMARY OF THE INVENTION

An embodiment of the invention is directed to an optical communication system operating in the O-band that has a transmitter and a receiver for receiving an optical signal generated between 1260 and 1360 nm by the transmitter. The optical communication system also has an optical fiber system coupled between the transmitter and the receiver for transmitting the optical signal. The optical fiber system has at least a first fiber segment coupled in series to a second fiber segment, so the optical signal propagates along both the first fiber segment and the second fiber segment from the transmitter to the receiver. The first fiber segment has a positive dispersion-wavelength gradient and a first zero dispersion wavelength, and the second fiber segment has a negative dispersion-wavelength gradient and a second zero dispersion wavelength. When light of the optical signal propagating along the first fiber segment has a wavelength shorter than the first zero dispersion wavelength and experiences a first amount of negative dispersion, the first amount of negative dispersion is at least partially compensated by a first amount of positive dispersion arising from propagation along the second fiber segment. When light of the optical signal propagating along the first fiber segment has a wavelength longer than the first zero dispersion wavelength and experiences a second amount of positive dispersion, the second amount of positive dispersion is at least partially compensated by a second amount of negative dispersion arising from propagation along the second fiber segment.

Another embodiment of the invention is directed to an optical communication system operating in the O-band that has a transmitter and a receiver for receiving an optical signal generated in a first wavelength domain from 1260 to 1360 nm by the transmitter. The optical communication system also has an optical fiber system coupled between the transmitter and the receiver for transmitting the optical signal. The optical fiber system has at least a first fiber segment coupled in series to a second fiber segment, so the optical signal propagates along both the first fiber segment and the second fiber segment from the transmitter to the receiver. The first fiber segment has a positive dispersion-wavelength gradient and a first zero dispersion wavelength, and the second fiber segment has a negative dispersion-wavelength gradient and a second zero dispersion wavelength. When light of the optical signal propagating along the first fiber segment has a wavelength shorter than the first zero dispersion wavelength in a short wavelength sub-domain of the first wavelength domain and experiences a first amount of negative dispersion, the first amount of negative dispersion is at least partially compensated by a first amount of positive dispersion arising from propagation along the second fiber segment. When light of the optical signal propagating along the first fiber segment has a wavelength longer than the first zero dispersion wavelength in a long wavelength sub-domain of the first wavelength domain and experiences a second amount of positive dispersion, the second amount of positive dispersion is at least partially compensated by a second amount of negative dispersion arising from propagation along the second fiber segment.

Another embodiment of the invention is directed to an optical communication system operating in the O-band that has a transmitter and a receiver for receiving an optical signal generated between 1260 and 1360 nm by the transmitter. The optical communication system also has an optical fiber system coupled between the transmitter and the receiver for transmitting the optical signal. The optical fiber system has at least a first fiber segment coupled in series to a second fiber segment, so the optical signal propagates along both the first fiber segment and the second fiber segment from the transmitter to the receiver. The first fiber segment has a positive dispersion-wavelength gradient and a first zero dispersion wavelength, and the second fiber segment has a negative dispersion-wavelength gradient and a second zero dispersion wavelength. When light of the optical signal propagating along the first fiber segment has a wavelength shorter than the first zero dispersion wavelength and the second zero dispersion wavelength and experiences a first amount of negative dispersion, the first amount of negative dispersion is at least partially compensated by a first amount of positive dispersion arising from propagation along the second fiber segment. When light of the optical signal propagating along the first fiber segment has a wavelength longer than the first zero dispersion wavelength and the second zero dispersion wavelength and experiences a second amount of positive dispersion, the second amount of positive dispersion is at least partially compensated by a second amount of negative dispersion arising from propagation along the second fiber segment.

Another embodiment of the invention is directed to an optical communication system operating in the O-band that has a transmitter and a receiver for receiving an optical signal generated between 1260 and 1360 nm by the transmitter. The optical communication system also has an optical fiber system coupled between the transmitter and the receiver for transmitting the optical signal. The optical fiber system has at least a first fiber segment coupled in series to a second fiber segment, so the optical signal propagates along both the first fiber segment and the second fiber segment from the transmitter to the receiver. The first fiber segment has a positive dispersion-wavelength gradient and a first zero dispersion wavelength, and the second fiber segment has a negative dispersion-wavelength gradient and a second zero dispersion wavelength. The first zero dispersion wavelength is within 20 nm of the second zero dispersion wavelength.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Optical communication systems operating in the O-band do not always employ optical signals exactly at the zero dispersion wavelength of the optical fiber, leading to some dispersion even in the O-band, since optical signals with wavelengths on either side of the zero dispersion wavelength still experience dispersion. Furthermore, unlike in the C-band around 1550 nm, dispersion in the O-band may be both positive and negative, for optical signals of wavelengths longer and shorter than the zero dispersion wavelength respectively. The inventors have realized that, even in the O-band, dispersion can decrease signal fidelity, reduce bandwidth, and reduce the range of short-range fiber systems. Such effects of dispersion are particularly evident for high data-rate systems. The invention described below addresses these problems, and permits O-band optical communications systems to operate over longer distances and/or to operate with increased bandwidth.

Figure 1:
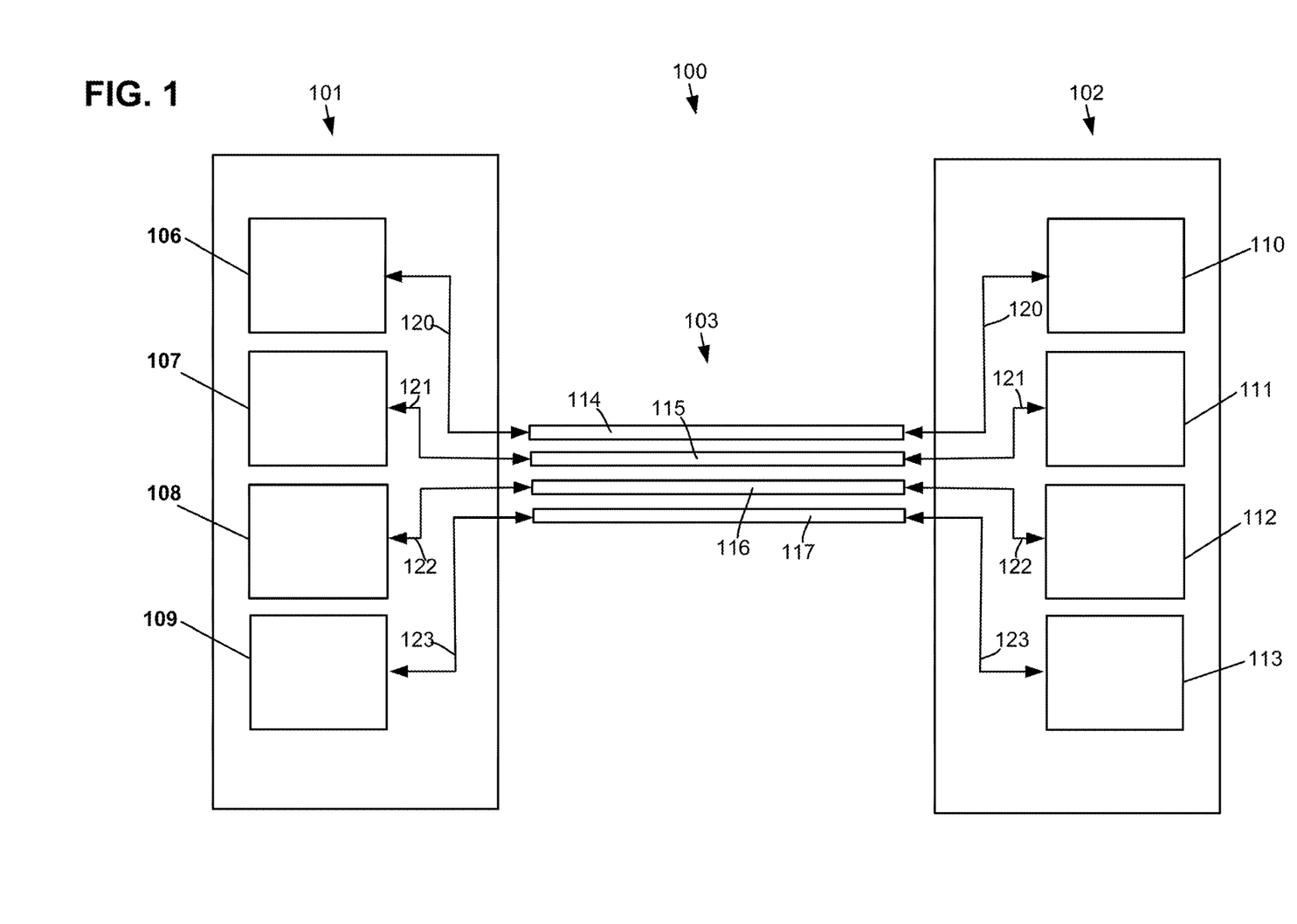
FIG. 1 schematically illustrates an embodiment of an O-band optical communication system that employs multiple, parallel optical fibers, according to an embodiment of the present invention.

An exemplary embodiment of an optical communication system 100 operating in the O-band is schematically illustrated in FIG. 1. The optical communication system 100 generally has a transmitter portion 101, a receiver portion 102, and a fiber optic portion 103. The fiber optic portion 103 is coupled between the transmitter portion 101 and the receiver portion 102 for transmitting an optical signal from the transmitter portion 101 to the receiver portion 102.

In this embodiment, the optical communication system 100 employs multiple, parallel fibers between the transmitter portion 101 and the receiver portion 102, for example in compliance with the 100G PSM4 (parallel single mode 4 lane) specification, version 2.0, published on Sep. 15, 2014 by the PSM4 MSA group, incorporated herein by reference. Transmitter portion 101 has multiple transmitters 106, 107, 108, 109 producing respective optical signals 120, 121, 122, 123. Since the optical communication system 100 operates in the O-band, the optical signals 120, 121, 122, 123 all fall within the O-band, having wavelengths between 1260 nm and 1360 nm and, in many embodiments, have wavelengths around 1310 nm. Each transmitter 106, 107, 108, 109 is coupled to a respective optical fiber system 114, 115, 116, 117. The optical fiber systems 114, 115, 116, 117 each contain at least two fiber segments, as is discussed further in reference to FIGS. 3-5 below. The optical fiber systems 114, 115, 116, 117 are also coupled to respective receivers 110, 111, 112, 113 of receiver portion 102.

Thus, an optical signal generated by a particular transmitter propagates along a particular optical fiber system and is received by a particular receiver. For example, transmitter 106 generates optical signal 120 with a wavelength between 1260 nm and 1360 nm. Transmitter 106 is coupled to optical fiber system 114 and optical signal 120 propagates along optical fiber system 114. Optical fiber system 114 is coupled to receiver 110 and optical signal 120 is received by receiver 110.

O-band optical communication system 100 is a multiple, parallel fiber design, like one compatible with the PSM4 standard. Thus, multiple transmitters 106, 107, 108, 109 of transmitter portion 101 are coupled to multiple optical fiber systems 114, 115, 116, 117 respectively, which in turn are coupled to multiple receivers 110, 111, 112, 113 respectively of receiver portion 102. Each one of these paths, from 106 to 114 to 110, from 107 to 115 to 111, from 108 to 116 to 112, from 109 to 117 to 113 is capable of a bandwidth such that the total bandwidth of O-band optical communication system 100 is the sum of each of these bandwidths.

The present invention is not limited to the multiple, parallel fiber design like depicted in FIG. 1. Different numbers of optical fibers may be used to transmit signals between the transmitter portion 101 and the receiver portion 102. For example, transmitter portion 101 may include only a single transmitter 106, generating optical signal 120, which propagates along a single optical fiber system 114 to be received by a single receiver 110 in the receiver portion 102. In another example, eight transmitters in the transmitter portion 101, or some other number of transmitters, may be connected to eight respective receivers in the receiver portion 102, or some other number of receivers, via eight respective optical fiber systems in the optical fiber portion 103, or some other number of optical fiber systems.

Figure 2:
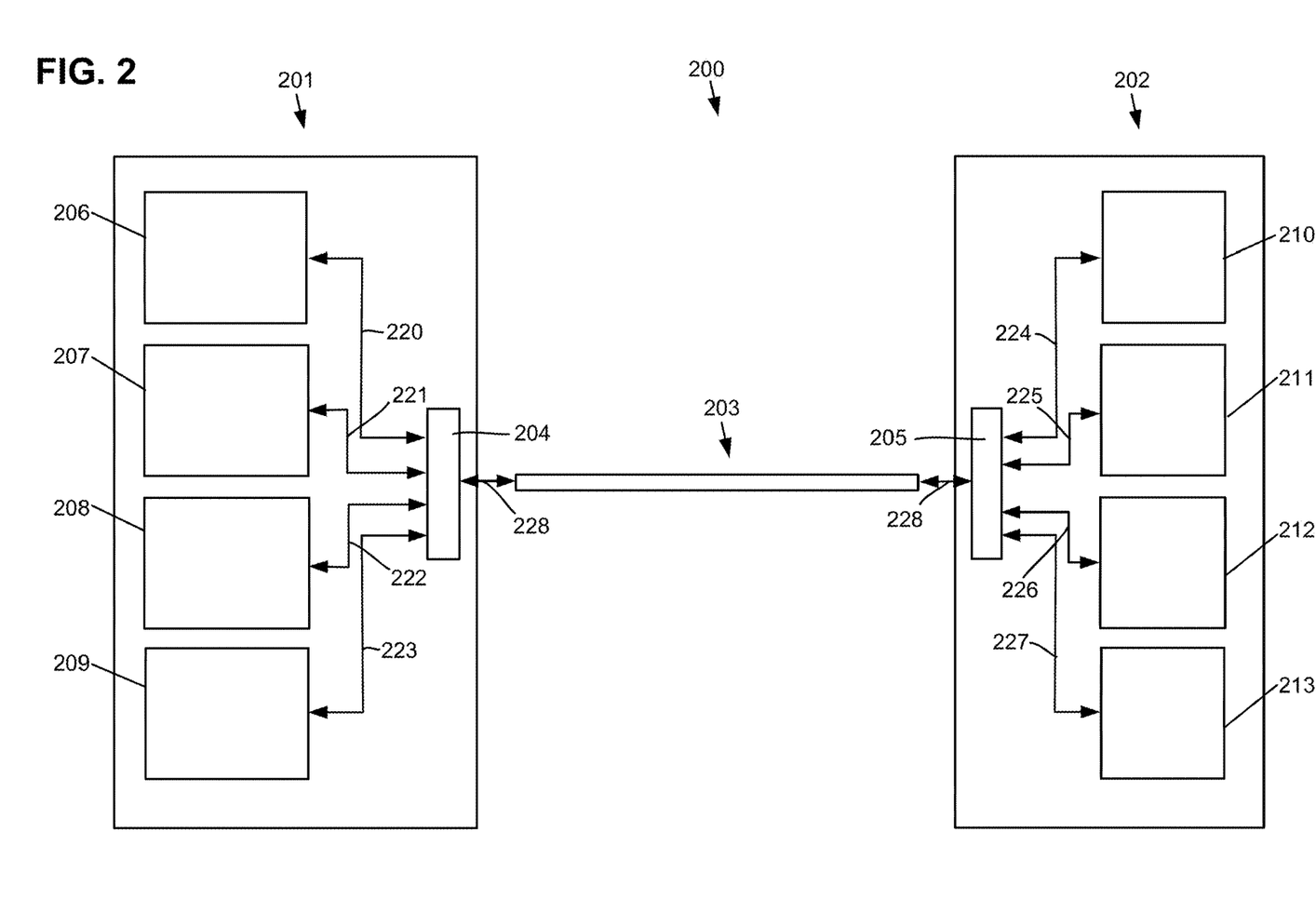
FIG. 2 schematically illustrates an embodiment of an O-band optical communication system that employs wavelength-division multiplexing, according to an embodiment of the present invention.

Another exemplary embodiment of an O-band optical communication system 200 is schematically illustrated in FIG. 2. The optical communication system 200 includes a transmitter portion 201, a receiver portion 202, and an optical fiber system 203 coupling between the transmitter portion 201 and the receiver portion 202 to transmit optical signal 228 from the transmitter portion 201 to the receiver portion 202.

In this embodiment, the optical communication system 200 is of a wavelength-division multiplexing design and may be compatible, for example, with the CWDM4 standard, as set forth in the 100G CWDM4 MSA Technical Specifications, version 1.1 released by the CWDM4MSA on Nov. 23, 2015, incorporated by reference, and the LR4 standard, as set forth in the IEEE Standard for Ethernet 802.3, Clause 88, which is incorporated by reference.

Transmitter portion 201 includes multiple transmitters 206, 207, 208, 209 and a multiplexer 204. Each transmitter 206, 207, 208, 209 generates respective pre-multiplexed optical signals 220, 221, 222, 223. It will be appreciated that since optical communication system 200 operates in the O-band, pre-multiplexed optical signals 220, 221, 222, 223 all fall within the O-band, having wavelengths between 1260 nm and 1360 nm, and in many embodiments, have wavelengths around 1310 nm. Each transmitter 206, 207, 208, 209 is coupled to the multiplexer 204 and pre-multiplexed optical signals 220, 221, 222, 223 generated by each transmitter 206, 207, 208, 209 are combined into multiplexed optical signal 228 by the multiplexer 204. In some embodiments, the optical signals 220, 221, 222, 223 are wavelength-multiplexed, in which case each of the pre-multiplexed optical signals 220, 221, 222, 223 lies within a respective wavelength band. One embodiment of wavelength multiplexed signals is described further with respect to FIG. 5, below.

Optical fiber system 203 is coupled to transmitter portion 201 such that multiplexed optical signal 228 propagates along optical fiber system 203. Optical fiber system 203 contains at least two fiber segments as discussed further below.

Optical fiber system 203 is coupled to receiver portion 202. Receiver portion 202 has multiple receivers 210, 211, 212, 213 and a de-multiplexer 205. The multiplexed optical signal 228 is de-multiplexed by the de-multiplexer 205 into de-multiplexed optical signals 224, 225, 226, 227 corresponding to optical signals 220, 221, 222, 223. The de-multiplexed optical signals 224, 225, 226, 227 are received by receivers 210, 211, 212, 213 respectively.

It will be appreciated that the present invention is not limited to multiplexed systems that use only four wavelength bands, but may be used with different numbers of multiplexed wavelengths. In addition, although the discussion of the embodiments of O-band communication systems above referred to transmitters and receivers, it will be appreciated that such communication systems may be provided with transceivers, capable of both receiving and transmitting optical signals. Thus, when considering an optical signal produced by a first transceiver and received by a second transceiver, for the purposes of this disclosure, the first transceiver may be considered to be a transmitter and the second transceiver considered to be a receiver.

Figure 3:
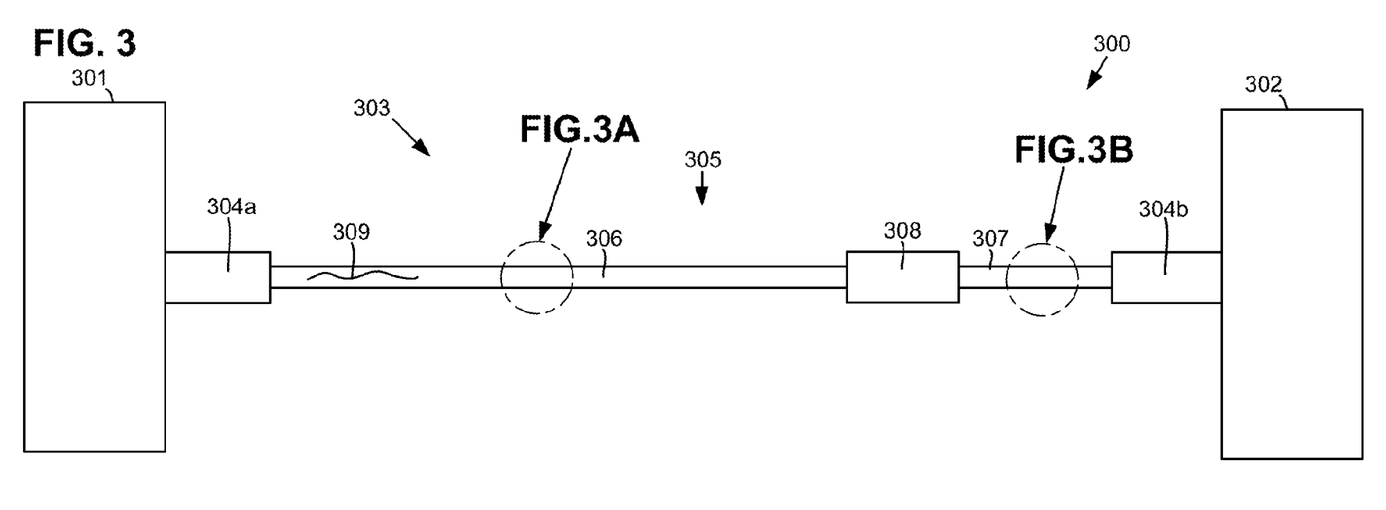
FIG. 3 schematically illustrates an optical fiber system as may be used in an O-band optical communication system, according to an embodiment of the present invention.

An exemplary embodiment of an optical communication system 300 that illustrates an optical fiber system 305 in greater detail, is schematically illustrated in FIG. 3. In the illustrated embodiment, the optical communication system 300 includes a transmitter portion 301 and a receiver portion 302 coupled via a fiber portion 303. The fiber portion 303 may be coupled to the transmitter portion 301 via a first fiber coupler 304a and to the receiver portion via a second fiber coupler 304b. The fiber portion 303 includes at least one optical fiber system 305. The optical fiber system 305 is coupled to the transmitter portion 301 and receiver portion 302 for transmitting optical signals from the transmitter portion 301 to the receiver portion 302. In accordance with the embodiments discussed above with respect to FIGS. 1 and 2, the optical fiber system 305 may carry an optical signal within a single wavelength band or may carry a multiplexed optical signal comprising components in different wavelength bands.

The optical fiber system 305 has at least two optical fiber segments 306 and 307. The first and second optical fiber segments 306 and 307 may be coupled together with coupler 308. Optical fiber segments 306 and 307 are coupled in series so that an optical signal 309 generated by transmitter portion 301, propagates along fiber segments 306 and 307, and is received by receiver portion 302. It will be appreciated that the order of fiber segments 306 and 307 can be interchanged when coupled in series, thus either the first or second optical fiber segment 306, 307 may be closer to the transmitter portion 301.

The embodiment illustrated in FIG. 3 with optical fiber system 305, conventional fiber segment 306, and compensating fiber segment 307 is exemplary. Other embodiments (not shown) may include an optical fiber system having more than one conventional fiber segment, and/or more than one compensating fiber segment. An example of such an alternative embodiment may have an optical fiber system with a first compensating fiber segment, followed in series by a first conventional fiber segment, followed in series by a second compensating fiber segment. Other alternative embodiments may have an optical fiber system with other numbers of conventional and compensating fiber segments, coupled in series in different orders. Net dispersion for such optical fiber systems can be calculated in a similar manner to that shown in the tables below.

Figure 3A:
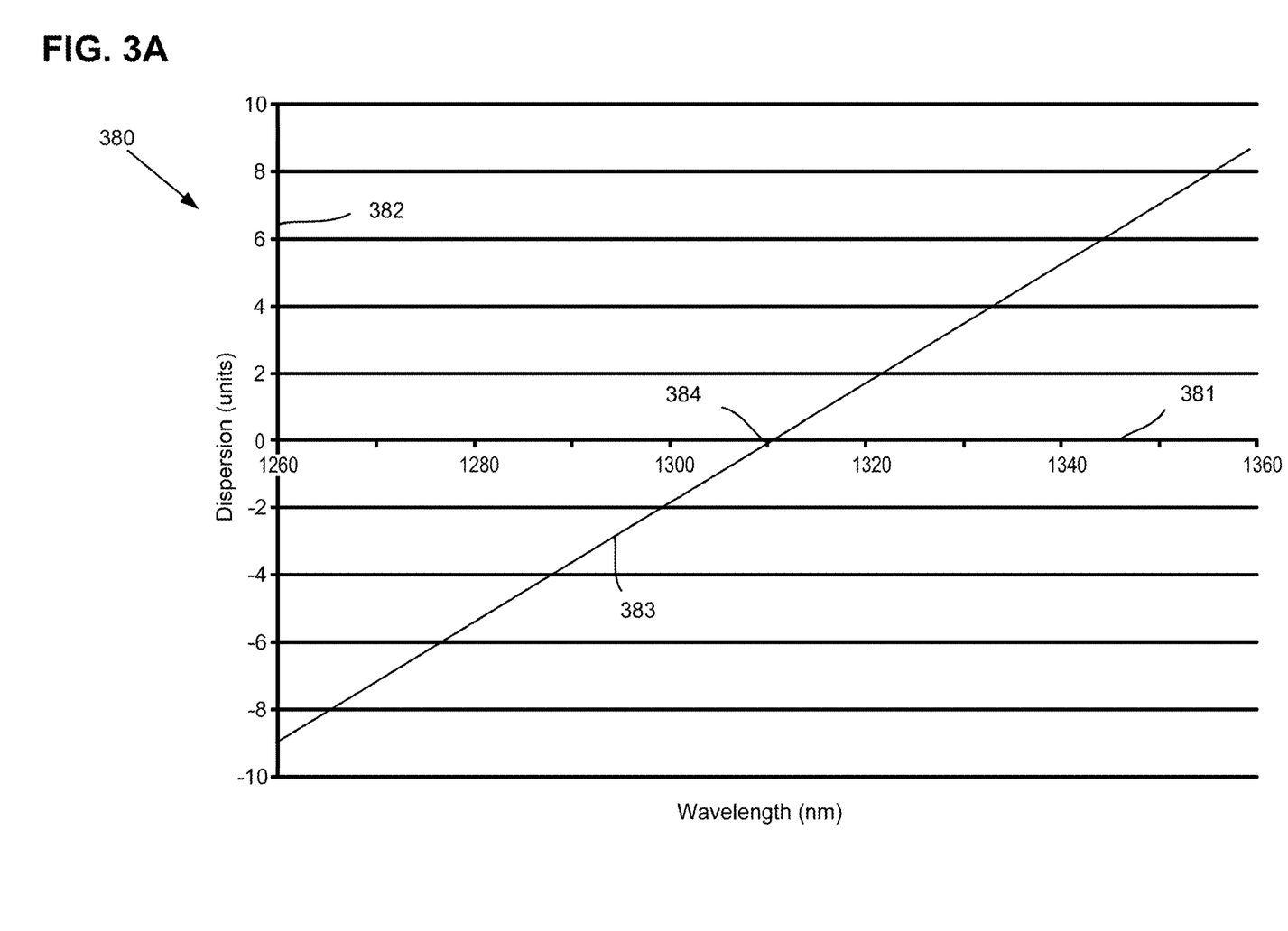
FIG. 3A illustrates a an exemplary dispersion-wavelength curve for a conventional optical fiber segment of the optical fiber system of the present invention.
Figure 3B:
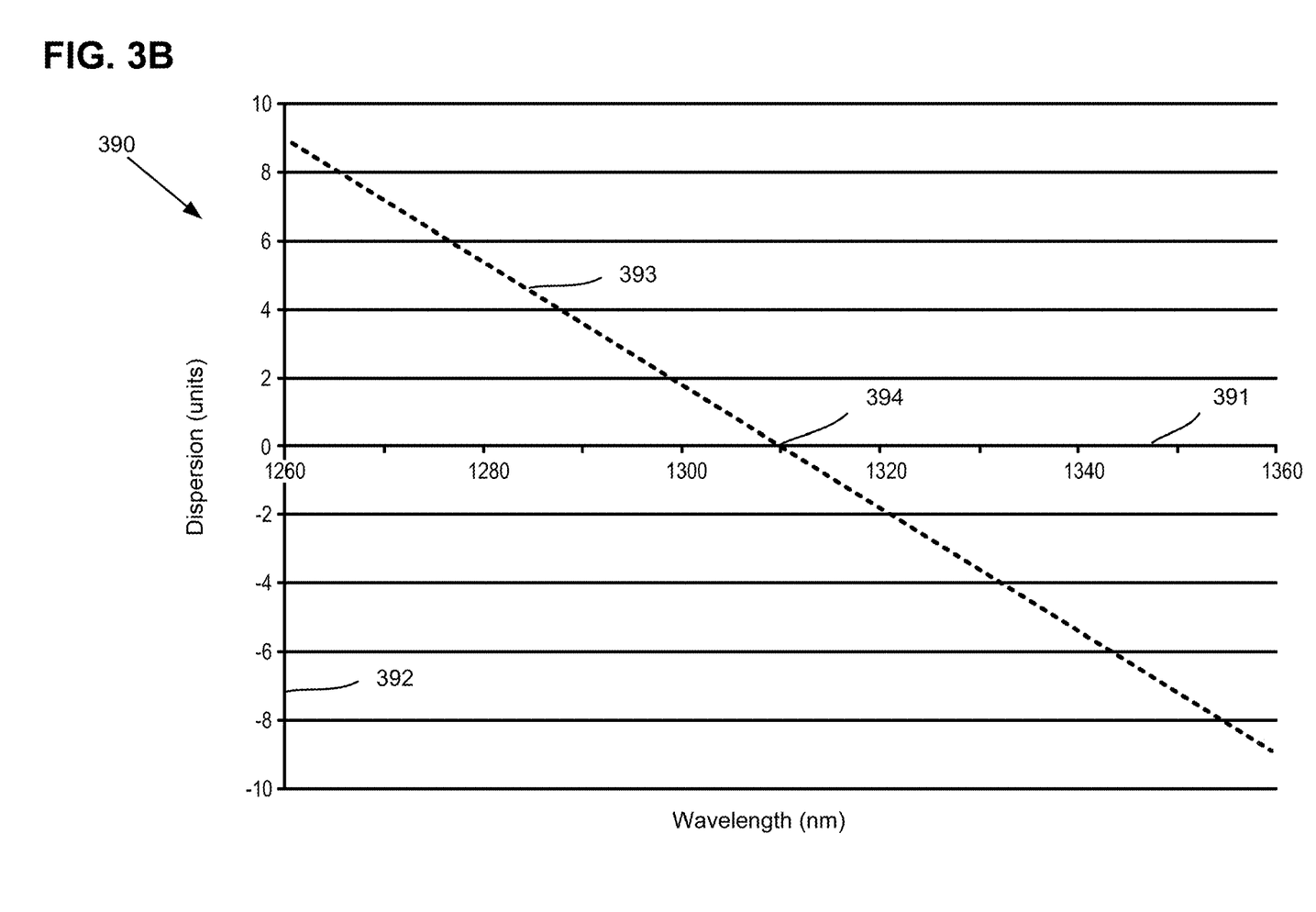
FIG. 3B illustrates an exemplary dispersion-wavelength curve for a compensating optical fiber segment of the optical fiber system of the present invention.

For the illustrated embodiment, in which first optical fiber segment 306 is closer to the transmitter portion 301, FIG. 3A shows an exemplary dispersion-wavelength graph 380 for the first fiber segment 306, and FIG. 3B shows an exemplary dispersion-wavelength graph 390 for fiber segment 307. In FIG. 3A, the x-axis 381 of dispersion-wavelength graph 380 represents the wavelength of an optical signal sent down the first optical fiber segment 306. Although the x-axis 381 is shown in units of nanometers, other units may be used. The y-axis 382 represents the amount of dispersion experienced by an optical signal propagating along the first optical fiber segment 306. Since this is an exemplary illustration, no units are provided on the y-axis 382 for dispersion values. However, a common unit of measurement for dispersion in optical fibers of a given length is picoseconds per nanometer.

Different optical fibers may have different dispersion-wavelength curves, due to, for example, different compositions or physical designs. As can be seen by an examination of FIG. 3A, the amount of dispersion experienced by an optical signal in a particular optical fiber is dependent on the wavelength of the light in the optical signal. Thus, dispersion-wavelength graph 380 shows a dispersion-wavelength curve 383 in the O-band describing the amount of dispersion as a function of wavelength for an exemplary optical fiber. Dispersion-wavelength curve 383 associated with optical fiber segment 306 has a positive slope or gradient, showing that, as the wavelength of light in the optical signal propagating along fiber segment 306 increases, the amount of dispersion increases. The dispersion-wavelength graph 380 also shows a zero dispersion wavelength 384 for dispersion-wavelength curve 383. The zero dispersion wavelength 384 of the dispersion curve 382 is the wavelength at which an optical signal propagating along fiber segment 306 experiences no dispersion. At wavelengths shorter than zero dispersion wavelength 384, an optical signal traveling along fiber segment 306 experiences negative dispersion, while at wavelengths longer than zero dispersion wavelength 384, an optical signal traveling along fiber segment 306 experiences positive dispersion.

FIG. 3A shows a dispersion-wavelength curve for only one example of a conventional optical fiber used in the first optical fiber segment 306. It will be appreciated that other curves may be associated with the first optical fiber segment, depending on the fiber materials and design, demonstrating different zero dispersion wavelengths and different slopes. However, the slope of the dispersion-wavelength curve for the first optical fiber segment 306 that uses a conventional silica-based optical fiber is typically positive.

In FIG. 3B, the x-axis 391 of dispersion-wavelength graph 390 represents the wavelength of an optical signal that propagates along the second optical fiber segment 307. The y-axis 392 represents the amount of dispersion experienced by an optical signal propagating along the second fiber segment 307. Since this is an exemplary illustration, no units are provided on the y-axis 392 for dispersion values. However, a common unit of measurement for dispersion in optical fibers of a given length is picoseconds per nanometer.

The dispersion-wavelength graph 390 shows a dispersion-wavelength curve 393 in the O-band describing the amount of dispersion as a function of wavelength for an exemplary optical fiber. The dispersion-wavelength curve 393 associated with optical fiber segment 307 has a negative slope, or gradient, showing that, as the wavelength of light in the optical signal propagating along fiber segment 307 increases, the amount of dispersion decreases. Dispersion-wavelength graph 390 also shows a zero dispersion wavelength 394 for dispersion-wavelength curve 393. Zero dispersion wavelength 394 of the dispersion curve 392 is the wavelength at which an optical signal propagating along fiber segment 307 experiences no dispersion. At wavelengths shorter than zero dispersion wavelength 394, an optical signal traveling along fiber segment 307 experiences positive dispersion, while at wavelengths longer than zero dispersion wavelength 394, an optical signal traveling along fiber segment 307 experiences negative dispersion.

FIG. 3B shows one example of a dispersion-wavelength curve for the second optical fiber segment 307, but it will be appreciated that other curves are possible. For many embodiments, the zero dispersion wavelength of a second fiber segment 307 will be in the vicinity of 1300-1320 nm, but other embodiments having zero dispersion wavelengths elsewhere in the O-band are not excluded. Furthermore, for many embodiments, the slope of the dispersion-wavelength curve for the second optical fiber segment 307, is negative and will at least partially compensate for dispersion in a first optical fiber segment 306, which in many embodiments will have a positive dispersion-wavelength curve. The values of the zero dispersion wavelength and the slope of the wavelength dispersion curve for the second optical fiber segment 307, may be selected in view of the corresponding characteristics of the first optical fiber segment 306 so that the second fiber segment can at least partially compensate for dispersion in the first optical fiber segment 306.

The ability to provide at least partial dispersion compensation is discussed in greater detail with reference to FIGS. 4 and 5. In many cases, the second optical fiber segment is capable of providing both positive and negative dispersion, depending on the wavelength of light in the optical signal, that provides compensation for negative and positive dispersion arising in the first optical fiber segment.

Figure 4:
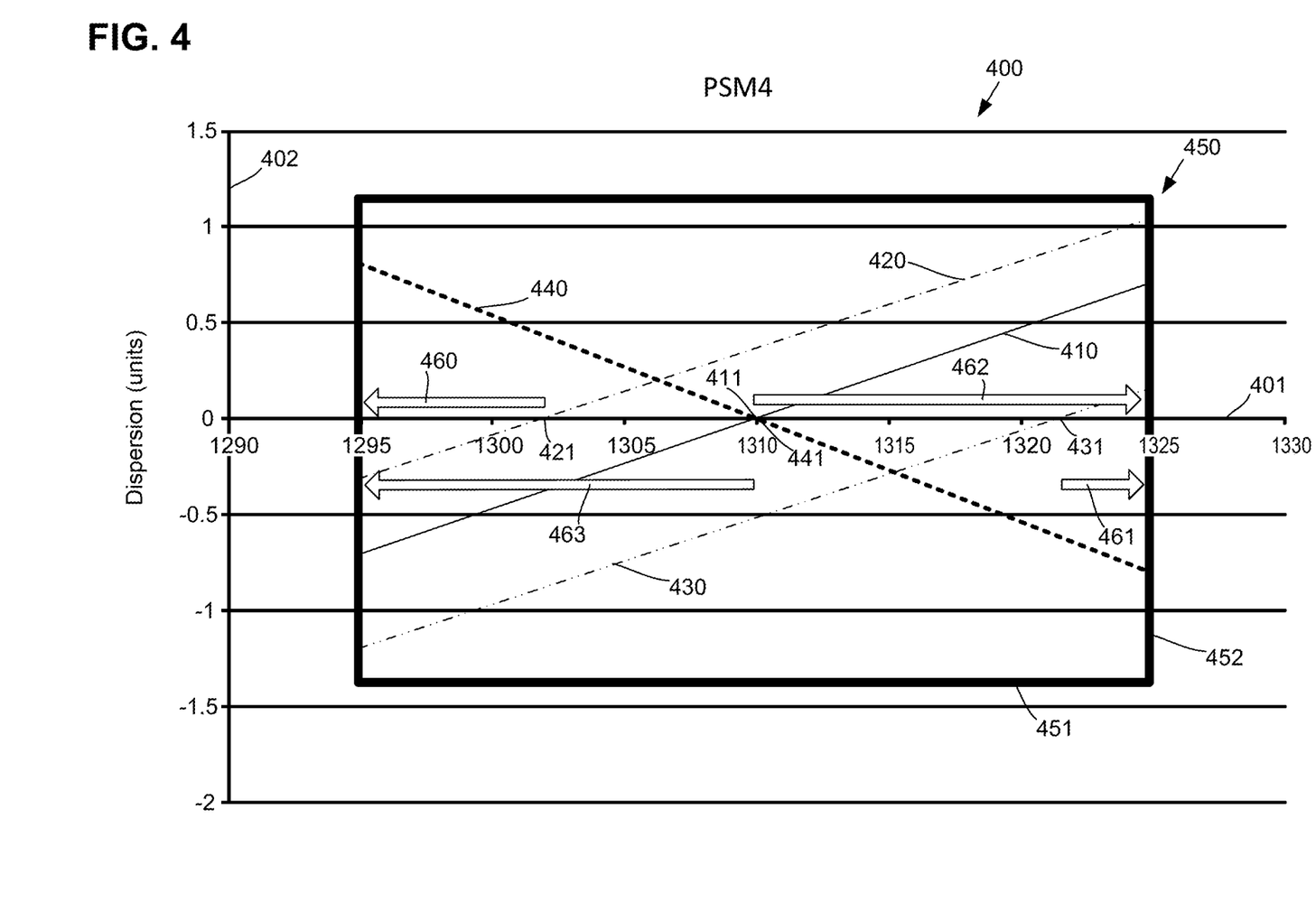
FIG. 4 illustrates exemplary dispersion-wavelength curves for fiber segments of an optical fiber system used in an O-band optical communication system using multiple, parallel optical fibers, according to an embodiment of the present invention.

FIG. 4 shows dispersion-wavelength curves for first and second optical fiber segments as used in an optical fiber system as part of an O-band optical communication system. In particular, FIG. 4 exemplifies dispersion-wavelength curves for an optical fiber system as might be used in an optical communication system of a multiple, parallel fiber design like one compatible with the PSM4 standard. Graph 400 has an x-axis 401 representing wavelengths of an optical signal and a y-axis 402 showing dispersion of light of the optical signal at different wavelengths. The acceptable wavelength and dispersion parameters for the PSM4 standard are shown generally by box 450, with an acceptable optical signal wavelength domain 451 of 1295 nm-1325 nm and an acceptable dispersion range 452 of −1.4 ps/nm to +1.2 ps/nm.

Three different, positive gradient, dispersion-wavelength curves 410, 420, 430 correspond to three different conventional first optical fiber segments, each having three different zero dispersion wavelengths 411, 421, 431 respectively at 1310 nm, 1302 nm and 1322 nm. A fourth dispersion-wavelength curve 440, having a negative slope, corresponds to a second optical fiber segment, having a zero dispersion wavelength 441 of 1310 nm. Although the zero dispersion wavelengths 411, 421, 431, 441 may have different values within the O-band, the zero dispersion wavelengths 411, 421, 431, 441 will often be found to be between 1295 nm and 1330 nm. In many embodiments, the zero dispersion wavelength of the fiber segment having the negatively sloped wavelength-dispersion curve will be within 30 nm, and more preferably within 20 nm, of the zero dispersion wavelength of the fiber segment having the positively sloped wavelength-dispersion curve. For the dispersion-wavelength curves shown in FIG. 4, the conventional fiber segments were assumed to be 500 meters in length, and the compensating fiber segment was assumed to be one tenth the length of the conventional fiber segments, namely 50 meters in length. It will be appreciated, however, that the curves illustrated in FIG. 4 are merely exemplary, and different embodiments may have different dispersion-wavelength curves corresponding to different lengths of conventional and compensating fibers segments, different length-ratios between the conventional and compensating fiber segments, different fiber materials and/or different waveguide designs.

In an exemplary O-band optical communication system having a conventional fiber segment that demonstrates a dispersion-wavelength curve 410, a second, compensating, optical fiber segment with dispersion-wavelength curve 440 provides positive dispersion compensation when an optical signal has a wavelength shorter than the zero dispersion wavelength 411 and experiences negative dispersion, while the compensating fiber segment provides negative dispersion compensation when an optical signal traveling along the first fiber segment has a wavelength longer than the zero dispersion wavelength 411 and experiences positive dispersion. In this way, the second, compensating optical fiber segment having dispersion-wavelength curve 440 is capable of providing both positive and negative dispersion compensation depending on the wavelength of light in an optical signal propagating along a conventional fiber segment having a dispersion-wavelength curve 410.

In another exemplary embodiment, which employs a conventional fiber segment associated with dispersion-wavelength curve 420, the compensating fiber segment with dispersion-wavelength curve 440 provides positive dispersion compensation when the optical signal has a wavelength shorter than zero dispersion wavelength 421, i.e. when the wavelength is in the short wavelength sub-domain 460, and experiences negative dispersion when propagating along the conventional fiber segment. The short wavelength sub-domain 460 covers those wavelengths at which light experiences negative dispersion in the conventional fiber associated with dispersion-wavelength curve 420 and experiences positive dispersion in the compensating fiber segment having dispersion-wavelength curve 440.

In the same embodiment, the compensating fiber segment with dispersion-wavelength curve 440 provides negative dispersion when the optical signal has a wavelength longer than zero dispersion wavelength 421, is in long wavelength sub-domain 462, and experiences positive dispersion when propagating along the conventional fiber segment associated with dispersion-wavelength curve 420. The long wavelength sub-domain 462 covers those wavelengths at which light experiences positive dispersion when traveling along the conventional fiber segment associated with dispersion-wavelength curve 420 and negative dispersion when traveling along the compensating fiber segment having dispersion-wavelength curve 440. Thus, the compensating fiber segment, associated with dispersion-wavelength curve 440 provides both positive and negative dispersion compensation in the short wavelength sub-domain 460 and the long wavelength sub-domain 462 respectively, depending on the wavelength of light in the optical signal propagating along the conventional fiber segment associated with the dispersion-wavelength curve 420.

In another exemplary embodiment, working in a similar manner, compensating fiber segment with dispersion-wavelength curve 440 provides both positive and negative dispersion compensation in the short wavelength sub-domain 463 and the long wavelength sub-domain 461 respectively, depending on the wavelength of light in the optical signal propagating along the conventional fiber segment associated with the dispersion-wavelength curve 430 and zero dispersion wavelength 431.

In another exemplary embodiment, which employs a conventional fiber segment associated with dispersion-wavelength curve 430, the compensating fiber segment with dispersion-wavelength curve 440 provides positive dispersion compensation when the optical signal experiences negative dispersion traveling along the conventional fiber segment and has a wavelength shorter than zero dispersion wavelength 431 of curve 430 and zero dispersion wavelength 441 of curve 440. Similarly, compensating fiber segment with dispersion-wavelength curve 440 provides negative dispersion compensation when the optical signal experiences positive dispersion traveling along the conventional fiber segment and has a wavelength longer than zero dispersion wavelength 431 of curve 430 and zero dispersion wavelength 441 of curve 440. Thus, the compensating fiber segment associated with dispersion-wavelength curve 440 provides both positive and negative dispersion compensation at least for the most extreme cases of negative and positive dispersion experienced by an optical signal propagating along the conventional fiber segment associated with dispersion-wavelength curve 430.

In another exemplary embodiment, working in a similar manner, compensating fiber segment associated with dispersion-wavelength curve 440 provides both positive and negative dispersion compensation at least for the most extreme cases of negative and positive dispersion experienced by an optical signal propagating along the conventional fiber segment associated with dispersion-wavelength curve 420 and zero dispersion wavelength 421.

The exemplary dispersion-wavelength curves 410, 420, 430 all correspond to conventional fiber segments of a particular length. Similarly, the exemplary dispersion-wavelength curve 440 corresponds to a compensating fiber segment of a particular length, which typically is shorter than the length of the conventional fiber segments. It will be appreciated that the exemplary dispersion-wavelength curves 410, 420, 430, 440 likely would have different forms, such as different slopes, if the length of the corresponding fiber segments were increased or decreased.

The table below shows the net dispersion of an optical signal at the extreme ends of wavelength domain 451 after propagating along an optical fiber system, for each of the conventional fiber segments associated with the dispersion-wavelength curves 410, 420, 430 and the compensating fiber segment associated with dispersion-wavelength curve 440.

TABLE 1

Net Dispersion

|  | λ (nm) | Dispersion (ps/nm) | Compensation (ps/nm) | Net dispersion (ps/nm) |
|---|---|---|---|---|
| Conventional Fiber | 1295 | −0.7 | +0.8 | +0.1 |
| Segment re 410 | 1325 | +0.7 | −0.8 | −0.1 |

|  | λ | Dispersion | Compensation | Net dispersion |
|---|---|---|---|---|
| Conventional Fiber | 1295 | −0.3 | +0.8 | +0.5 |
| Segment re 420 | 1325 | +1.0 | −0.8 | −0.2 |
| Conventional Fiber | 1295 | −1.2 | +0.8 | −0.4 |
| Segment re 430 | 1325 | +0.2 | −0.8 | −0.6 |

For the conventional fiber segment associated with dispersion-wavelength curve 410, an optical signal of 1295 nm is dispersed −0.7 ps/nm, while an optical signal of 1325 nm is dispersed +0.7 ps/nm. Compensating fiber segment corresponding to dispersion-wavelength curve 440 provides +0.8 ps/nm of dispersion for an optical signal at 1295 nm, and −0.8 ps/nm of dispersion for an optical signal at 1325 nm. Thus, after propagating along both the conventional fiber segment corresponding to dispersion-wavelength curve 410, and the compensating fiber segment corresponding to dispersion-wavelength curve 440, an optical signal at 1295 nm would experience net dispersion of +0.1 ps/nm, and an optical signal at 1325 nm would experience net dispersion of −0.1 ps/nm.

Similar results can be seen for the conventional fiber segments corresponding to dispersion-wavelength curves 420 and 430. Namely, after propagating along both the conventional fiber segment corresponding to dispersion-wavelength curve 420, and the compensating fiber segment corresponding to dispersion-wavelength curve 440, an optical signal at 1295 nm would experience net dispersion of +0.5 ps/nm, and an optical signal at 1325 nm would experience net dispersion of −0.2 ps/nm. And, after propagating along both the conventional fiber segment corresponding to dispersion-wavelength curve 430, and the compensating fiber segment corresponding to dispersion-wavelength curve 440, an optical signal at 1295 nm would experience net dispersion of −0.4 ps/nm, and an optical signal at 1325 nm would experience net dispersion of −0.6 ps/nm.

Thus, whereas an uncompensated optical signal propagating along a conventional fiber segment corresponding to dispersion-wavelength curve 410 would experience a largest dispersion of +/−0.7 ps/nm over a given length, when also propagated along the compensating fiber segment corresponding to dispersion-wavelength curve 440, the largest net dispersion experienced by the optical signal is +/−0.1 ps/nm. Similarly, whereas an uncompensated optical signal propagating along a conventional fiber segment corresponding to dispersion-wavelength curve 420 would experience a largest dispersion of +1.0 ps/nm over a given length, when also propagated along the compensating fiber segment corresponding to dispersion-wavelength curve 440, the largest net dispersion experienced by the optical signal is +0.5 ps/nm. And whereas an uncompensated optical signal propagating along a conventional fiber segment corresponding to dispersion-wavelength curve 430 would experience a largest dispersion of −1.2 ps/nm over a given length, when also propagated along the compensating fiber segment corresponding to dispersion-wavelength curve 440, the largest net dispersion experienced by the optical signal is −0.6 ps/nm.

Reducing the maximum net dispersion experienced by an optical signal over an optical fiber system in such a manner allows one to design optical communications systems of increased bandwidth and/or physical range while ensuring that maximum dispersion values remain lower than shorter, uncompensated systems. Thus, the present invention leads to increased bandwidth and/or physical range for O-band optical communication systems.

Figure 5:
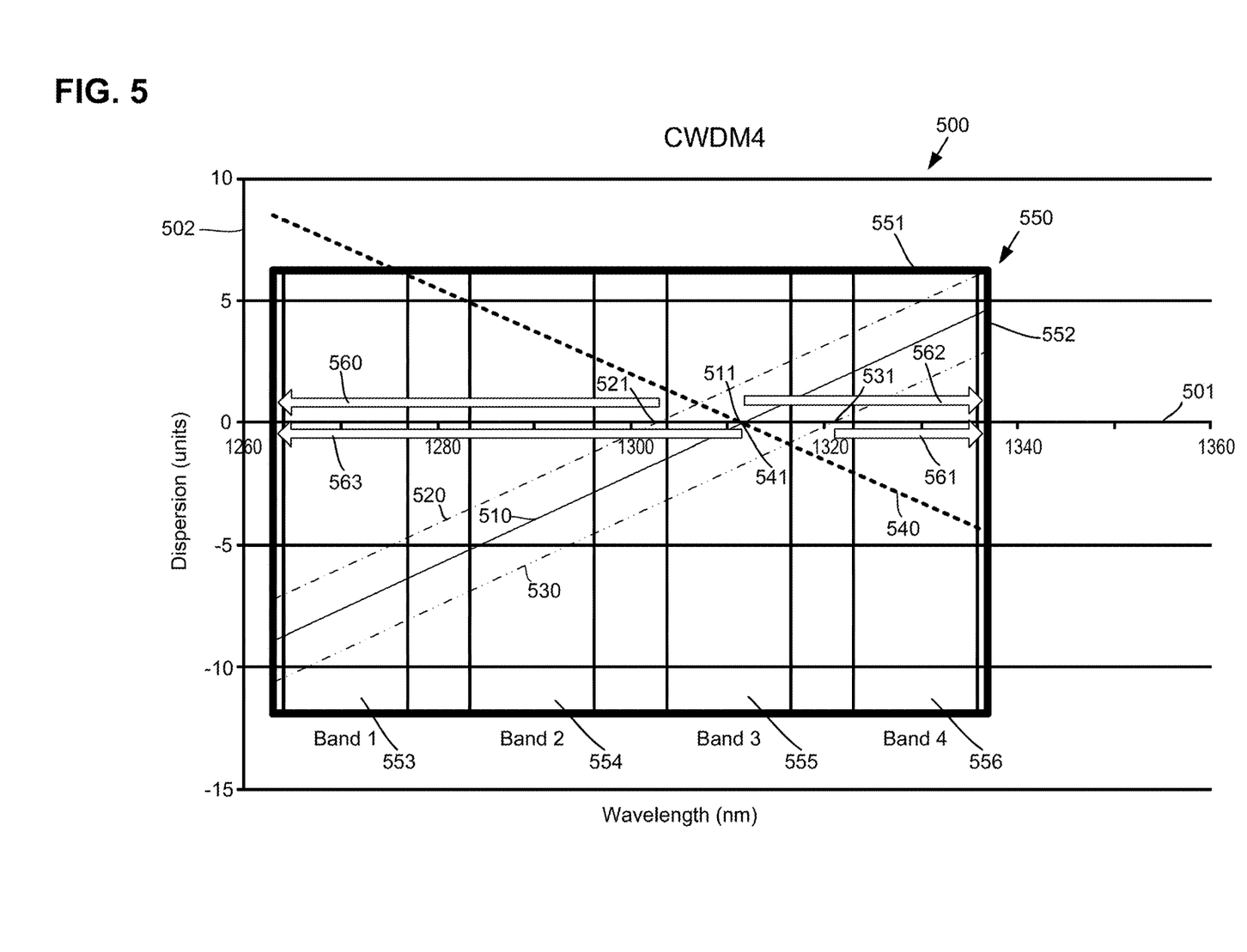
FIG. 5 illustrates exemplary dispersion-wavelength curves for fiber segments of an optical fiber system used in an O-band optical communication system using wavelength-division multiplexing, according to an embodiment of the present invention.

FIG. 5 illustrates dispersion-wavelength curves for first and second optical fiber segments as used in an optical fiber system as part of an O-band optical communication system. More particularly, FIG. 5 exemplifies dispersion-wavelength curves for an optical fiber system as might be used in an optical communication system of a wavelength-division multiplexing design such as one compatible with the CDWM4 standard. Graph 500 has an x-axis 501 representing wavelengths of an optical signal and a y-axis 502 showing dispersion of light of the optical signal at different wavelengths. The acceptable wavelength and dispersion parameters for the CWDM4 standard are shown generally by box 550, with an acceptable optical signal wavelength domain 551 of 1264.5 nm to 1337.5 nm, and an acceptable dispersion range 552 of −11.9 ps/nm to +6.7 ps/nm. While the parameters for the CWDM4 standard are shown, the invention is not limited to that particular wavelength-division multiplexing design. Many other wavelength-division multiplexing embodiments, for example embodiments compatible with the LR4 standard, also are contemplated by the invention.

Three different dispersion-wavelength curves 510, 520, 530 correspond to three different conventional fiber segments of the kind shown in FIG. 3 as first optical fiber segment 306, each having three different zero dispersion wavelengths 511, 521, 531 respectively, at 1312 nm, 1303 nm and 1321 nm. The three dispersion-wavelength curves 510, 520, 530 each have a positive slope. A fourth dispersion-wavelength curve 540 corresponds to a compensation fiber segment of the kind shown in FIG. 3 as second optical fiber segment, with a zero dispersion wavelength 541 at 1312 nm. The dispersion-wavelength curve 540 has a negative slope. Although zero dispersion wavelengths 511, 521, 531, 541 may be anywhere within the O-band, in many embodiments the zero dispersion wavelengths 511, 521, 531, 541 will be between 1285 nm and 1330 nm. In many embodiments, zero dispersion wavelength 541 will be within 30 nm of the zero dispersion wavelength corresponding to a conventional fiber segment, preferably within 20 nm, though the separation between these zero dispersion wavelengths can be larger, being within the domain of the O-band. For the dispersion-wavelength curves shown in FIG. 5, the conventional fiber segments were assumed to be 2000 meters in length, and the compensating fiber segment was assumed to be one tenth the length of the conventional fiber segments, namely 200 meters in length. It will be appreciated, however, that the curves illustrated in FIG. 5 are merely exemplary, and different embodiments may have different dispersion-wavelength curves corresponding to different lengths of conventional and compensating fibers segments, different length-ratios between the conventional and compensating fiber segments, different fiber materials and/or different waveguide designs.

In an embodiment having a conventional fiber segment with a dispersion-wavelength curve 510, the compensating fiber segment, associated with dispersion-wavelength curve 540, provides positive dispersion compensation when an optical signal has a wavelength shorter than the zero dispersion wavelength 511 and experiences negative dispersion in the conventional fiber segment. The compensating fiber segment provides negative dispersion compensation when an optical signal traveling along the conventional fiber segment has a wavelength longer than its zero dispersion wavelength 511 and experiences positive dispersion. Thus, the compensating fiber segment, associated with dispersion-wavelength curve 540, can provide both positive and negative dispersion compensation depending on the wavelength of light in the optical signal propagating along the conventional fiber segment associated with the dispersion-wavelength curve 510.

Four wavelength bands 553, 554, 555, 556, within the wavelength domain 551, correspond to different wavelengths that can be combined together to make a multiplexed optical signal, for example according to the CWDM4 standard. Different embodiments of O-band optical communication systems according to the present invention are not restricted to using only four different wavelength bands, and may use different numbers of bands.

In some embodiments, light in one or more bands may experience only negative dispersion while propagating along the conventional fiber segment, for example bands 553, 554, while light in some bands may experience only positive dispersion while propagating along the conventional fiber segment, for example band 556. Light in other bands may experience either positive or negative dispersion while propagating along the conventional fiber segment, for example band 555, depending on the particular wavelength of light within the band.

In another embodiment that employs a conventional fiber segment associated with dispersion-wavelength curve 520, the compensating fiber segment with dispersion-wavelength curve 540 provides positive dispersion compensation when an optical signal within wavelength domain 551 has a wavelength shorter than the zero dispersion wavelength 521, is in short wavelength sub-domain 560, and experiences negative dispersion when propagating along the conventional fiber segment. Short wavelength sub-domain 560 corresponds to the range of wavelengths in which light experiences negative dispersion when traveling along conventional fiber segment with dispersion-wavelength curve 520 and positive dispersion when traveling along fiber segment with dispersion-wavelength curve 540.

In the same embodiment, the fiber segment with dispersion-wavelength curve 540 provides negative dispersion when an optical signal within wavelength domain 551 has a wavelength longer than the zero dispersion wavelength 521, is in long wavelength sub-domain 562, and experiences positive dispersion when propagating along the conventional fiber segment. Long wavelength sub-domain 562 covers the range of wavelengths at which light experiences positive dispersion when traveling along the conventional fiber segment with dispersion-wavelength curve 520 and negative dispersion when traveling along the compensating fiber segment with dispersion-wavelength curve 540. Thus, the compensating fiber segment with dispersion-wavelength curve 540 is capable of providing both positive and negative dispersion compensation in the short wavelength sub-domain 560 and long wavelength sub-domain 562 respectively, depending on the wavelength of the light the optical signal.

In another exemplary embodiment, working in a similar manner, compensating fiber segment with dispersion-wavelength curve 540 provides both positive and negative dispersion compensation in the short wavelength sub-domain 563 and the long wavelength sub-domain 561 respectively, depending on the wavelength of light in the optical signal propagating along the conventional fiber segment associated with the dispersion-wavelength curve 530 and zero dispersion wavelength 531.

In another exemplary embodiment, which employs a conventional fiber segment associated with dispersion-wavelength curve 530, the compensating fiber segment with dispersion-wavelength curve 540 provides positive dispersion compensation when the optical signal experiences negative dispersion traveling along the conventional fiber segment and has a wavelength shorter than zero dispersion wavelength 531 of curve 530 and zero dispersion wavelength 541 of curve 540. Similarly, compensating fiber segment with dispersion-wavelength curve 540 provides negative dispersion compensation when the optical signal experiences positive dispersion traveling along the conventional fiber segment and has a wavelength longer than zero dispersion wavelength 531 of curve 530 and zero dispersion wavelength 541 of curve 540. Thus, the compensating fiber segment associated with dispersion-wavelength curve 540 provides both positive and negative dispersion compensation at least for the most extreme cases of negative and positive dispersion experienced by an optical signal propagating along the conventional fiber segment associated with dispersion-wavelength curve 530.

In another exemplary embodiment, working in a similar manner, compensating fiber segment associated with dispersion-wavelength curve 540 provides both positive and negative dispersion compensation at least for the most extreme cases of negative and positive dispersion experienced by an optical signal propagating along conventional fiber segment associated with dispersion-wavelength curve 520 and zero dispersion wavelength 521.

The exemplary dispersion-wavelength curves 510, 520, 530 all correspond to conventional fiber segments of a particular length. Similarly, the exemplary dispersion-wavelength curve 540 corresponds to a compensating fiber segment of a length that is typically shorter than the length of the conventional fiber segments. It will be appreciated that the exemplary dispersion-wavelength curves 510, 520, 530, 540 likely would have different forms, such as different slopes, if the length of the corresponding fiber segments were increased or decreased.

The table below shows the net dispersion of an optical signal at the extreme ends of wavelength domain 551 after propagating along an optical fiber system, for each of the conventional fiber segments associated with the dispersion-wavelength curves 510, 520, 530 and the compensating fiber segment associated with dispersion-wavelength curve 540.

TABLE 2

Net Dispersion

| | λ (nm) | Dispersion (ps/nm) | Compensation (ps/nm) | Net dispersion (ps/nm) |
|---|---|---|---|---|
| Conventional Fiber | 1264.5 | −9.0 | +8.5 | −0.5 |
| Segment re 510 | 1337.5 | +4.5 | −4.5 | 0.0 |
| Conventional Fiber | 1264.5 | −7.0 | +8.5 | +1.5 |
| Segment re 520 | 1337.5 | +6.0 | −4.5 | +1.5 |
| Conventional Fiber | 1264.5 | −11 | +8.5 | −2.5 |
| Segment re 530 | 1337.5 | +3.0 | −4.5 | −1.5 |

For the conventional fiber segment associated with dispersion-wavelength curve 510, an optical signal of 1264.5 nm is dispersed −9.0 ps/nm, while an optical signal of 1337.5 nm is dispersed +4.5 ps/nm. Compensating fiber segment corresponding to dispersion-wavelength curve 540 provides +8.5 ps/nm of dispersion for an optical signal at 1264.5 nm, and −4.5 ps/nm of dispersion for an optical signal at 1337.5 nm. Thus, after propagating along both the conventional fiber segment corresponding to dispersion-wavelength curve 510, and the compensating fiber segment corresponding to dispersion-wavelength curve 540, an optical signal at 1264.5 nm would experience net dispersion of −0.5 ps/nm, and an optical signal at 1337.5 nm would experience net dispersion of 0.0 ps/nm.

Similar results can be seen for the conventional fiber segments corresponding to dispersion-wavelength curves 520 and 530. Namely, after propagating along both the conventional fiber segment corresponding to dispersion-wavelength curve 520, and the compensating fiber segment corresponding to dispersion-wavelength curve 540, an optical signal at 1264.5 nm would experience net dispersion of +1.5 ps/nm, and an optical signal at 1337.5 nm would experience net dispersion of +1.5 ps/nm. And, after propagating along both the conventional fiber segment corresponding to dispersion-wavelength curve 530, and the compensating fiber segment corresponding to dispersion-wavelength curve 540, an optical signal at 1264.5 nm would experience net dispersion of −2.5 ps/nm, and an optical signal at 1337.5 nm would experience net dispersion of −1.5 ps/nm.

Thus, whereas an uncompensated optical signal propagating along a conventional fiber segment corresponding to dispersion-wavelength curve 510 would experience a largest dispersion of −9.0 ps/nm over a given length, when also propagated along the compensating fiber segment corresponding to dispersion-wavelength curve 540, the largest net dispersion experienced by the optical signal is −0.5 ps/nm. Similarly, whereas an uncompensated optical signal propagating along a conventional fiber segment corresponding to dispersion-wavelength curve 520 would experience a largest dispersion of −7.0 ps/nm over a given length, when also propagated along the compensating fiber segment corresponding to dispersion-wavelength curve 540, the largest net dispersion experienced by the optical signal is +1.5 ps/nm. And whereas an uncompensated optical signal propagating along a conventional fiber segment corresponding to dispersion-wavelength curve 530 would experience a largest dispersion of −11 ps/nm over a given length, when also propagated along the compensating fiber segment corresponding to dispersion-wavelength curve 540, the largest net dispersion experienced by the optical signal is −2.5 ps/nm. Reducing the maximum net dispersion experienced by an optical signal over an optical fiber system in such a manner allows the design of optical communications systems of increased bandwidth and/or physical range while ensuring that maximum dispersion values remain lower than shorter, uncompensated systems. Thus, the present invention leads to increased bandwidth and/or physical range for O-band optical communication systems.

Various modifications, equivalent processes, as well as numerous structures to which the present invention may be applicable will be readily apparent to those of skill in the art to which the present invention is directed upon review of the present specification. The claims are intended to cover such modifications and devices.

As noted above, the present invention is applicable to fiber optical communication and data transmission systems. Accordingly, the present invention should not be considered limited to the particular examples described above, but rather should be understood to cover all aspects of the invention as fairly set out in the attached claims.

| Element Number | Description |
|---|---|
| 100 | O-band optical communication system |
| 101 | Transmitter portion |
| 102 | Receiver portion |
| 103 | Fiber optic portion |
| 106 | Transmitter |
| 107 | Transmitter |
| 108 | Transmitter |
| 109 | Transmitter |
| 110 | Receiver |
| 111 | Receiver |
| 112 | Receiver |
| 113 | Receiver |
| 114 | Optical fiber system |
| 115 | Optical fiber system |
| 116 | Optical fiber system |
| 117 | Optical fiber system |
| 120 | Optical signal |
| 121 | Optical signal |
| 122 | Optical signal |
| 123 | Optical signal |
| 200 | O-band optical communication system |
| 201 | Transmitter portion |
| 202 | Receiver portion |
| 203 | Optical fiber system |
| 204 | Multiplexer |
| 205 | De-multiplexer |
| 206 | Transmitter |
| 207 | Transmitter |
| 208 | Transmitter |
| 209 | Transmitter |
| 210 | Receiver |
| 211 | Receiver |
| 212 | Receiver |
| 213 | Receiver |
| 220 | Pre-multiplexed optical signal |
| 221 | Pre-multiplexed optical signal |
| 222 | Pre-multiplexed optical signal |
| 223 | Pre-multiplexed optical signal |
| 224 | De-multiplexed optical signal |
| 225 | De-multiplexed optical signal |
| 226 | De-multiplexed optical signal |
| 227 | De-multiplexed optical signal |
| 228 | Multiplexed optical signal |
| 300 | Optical communication system |
| 301 | Transmitter portion |
| 302 | Receiver portion |
| 303 | Fiber portion |
| 304a | First fiber coupler |
| 304b | Second fiber coupler |
| 305 | Optical fiber system |
| 306 | First optical fiber segment |
| 307 | Second optical fiber segment |
| 308 | Coupler |
| 309 | Optical signal |
| 380 | Dispersion-wavelength graph for the first fiber segment |
| 381 | X-axis |
| 382 | Y-axis |
| 383 | Dispersion-wavelength curve |
| 384 | Zero dispersion wavelength |
| 390 | Dispersion-wavelength graph for the second fiber segment |
| 391 | X-axis |
| 392 | Y-axis |
| 393 | Dispersion-wavelength curve |
| 394 | Zero dispersion wavelength |
| 400 | Dispersion-wavelength graph |
| 401 | X-axis |
| 402 | Y-axis |
| 410 | Dispersion-wavelength curve |
| 411 | Zero dispersion wavelength |
| 420 | Dispersion-wavelength curve |
| 421 | Zero dispersion wavelength |
| 430 | Dispersion-wavelength curve |
| 431 | Zero dispersion wavelength |
| 440 | Dispersion-wavelength curve |
| 441 | Zero dispersion wavelength |
| 450 | Acceptable wavelength and dispersion parameters for PSM4 standard |
| 451 | Acceptable wavelength domain for PSM4 standard |

-continued

| Element Number | Description |
| --- | --- |
| 452 | Acceptable dispersion range for PSM4 standard |
| 460 | Short wavelength sub-domain |
| 461 | Long wavelength sub-domain |
| 462 | Long wavelength sub-domain |
| 463 | Short wavelength sub-domain |
| 500 | Dispersion-wavelength graph |
| 501 | X-axis |
| 502 | Y-axis |
| 510 | Dispersion-wavelength curve |
| 511 | Zero dispersion wavelength |
| 520 | Dispersion-wavelength curve |
| 521 | Zero dispersion wavelength |
| 530 | Dispersion-wavelength curve |
| 531 | Zero dispersion wavelength |
| 540 | Dispersion-wavelength curve |
| 541 | Zero dispersion wavelength |
| 550 | Acceptable wavelength and dispersion parameters for CWDM4 standard |
| 551 | Acceptable wavelength domain for CWDM4 standard |
| 552 | Acceptable dispersion range for CWDM4 standard |
| 553 | Wavelength band |
| 554 | Wavelength band |
| 555 | Wavelength band |
| 556 | Wavelength band |
| 560 | Short wavelength sub-domain |
| 561 | Long wavelength sub-domain |
| 562 | Long wavelength sub-domain |
| 563 | Short wavelength sub-domain |

What we claim as the invention is:

1. An O-band optical communication system, comprising:
a first transmitter capable of generating a first optical signal with a wavelength between 1260 nm and 1360 nm;
a first receiver capable of receiving the first optical signal; and
a first optical fiber system coupled between the first transmitter and the first receiver to transmit the first optical signal from the first transmitter portion to the first receiver portion, the first optical fiber system comprising at least a first fiber segment coupled in series to a second fiber segment so that an optical signal passing from the first transmitter to the first receiver passes through the first and second fiber segments;
wherein the first fiber segment has a positive dispersion-wavelength gradient and a first zero dispersion wavelength, the first zero dispersion wavelength being in the range 1295 nm-1330 nm; and
wherein the second fiber segment has a negative dispersion-wavelength gradient and a second zero dispersion wavelength, the second zero dispersion wavelength being in the range of 1295 nm-1330 nm and different from the first zero dispersion wavelength by at least about 8 nm.

2. The O-band optical communication system as recited in claim 1, wherein when light of the first optical signal propagating along the first fiber segment has a wavelength shorter than the first zero dispersion wavelength and experiences a first amount of negative dispersion, the first amount of negative dispersion is at least partially compensated by a first amount of positive dispersion arising from propagation along the second fiber segment, and
wherein when light of the first optical signal propagating along the first fiber segment has a wavelength longer than the first zero dispersion wavelength and experiences a second amount of positive dispersion, the second amount of positive dispersion is at least partially compensated by a second amount of negative dispersion arising from propagation along the second fiber segment.

3. The O-band optical communication system of claim 1, wherein the first optical signal is a wavelength-division multiplexed optical signal.

4. The O-band optical communication system of claim 1, wherein the first transmitter generates the first optical signal at a wavelength shorter than the first zero dispersion wavelength and a second optical signal at a wavelength longer than the first zero dispersion wavelength.

5. An O-band optical communication system, comprising:
an optical fiber system having an input and an output, the optical fiber system comprising at least a first fiber segment coupled in series to a second fiber segment so that a first optical signal propagating from the input of the optical fiber system to the output of the optical fiber system passes through both the first fiber segment and the second fiber segment;
wherein the first fiber segment has a positive dispersion-wavelength gradient and a first zero dispersion wavelength in the range 1295 nm-1330 nm,
wherein the second fiber segment has a negative dispersion-wavelength gradient and a second zero dispersion wavelength in the range 1295 nm-1330 nm, different from the first zero dispersion wavelength,
wherein when light of the first optical signal propagating along the first fiber segment has a wavelength shorter than the first zero dispersion wavelength and the second zero dispersion wavelength and experiences a first amount of negative dispersion, the first amount of negative dispersion is at least partially compensated by a first amount of positive dispersion arising from propagation along the second fiber segment, and
wherein when light of the first optical signal propagating along the first fiber segment has a wavelength longer than the first zero dispersion wavelength and the second zero dispersion wavelength and experiences a second amount of positive dispersion, the second amount of positive dispersion is at least partially compensated by a second amount of negative dispersion arising from propagation along the second fiber segment.

6. The O-band optical communication system of claim 5, wherein the second zero dispersion wavelength is different from the first zero dispersion wavelength by at least about 8 nm.

7. The O-band optical communication system of claim 5, further comprising a transmitter capable of generating the first optical signal, the transmitter being coupled to the input of the optical fiber system so that the first optical signal propagates into the optical fiber system from the transmitter.

8. The O-band optical communication system of claim 7, further comprising an optical receiver capable of receiving the first optical signal, the optical receiver being coupled to the output of the optical fiber system so that the first optical signal propagates from the output of the optical fiber system to the optical receiver.

9. The O-band optical communication system of claim 7, wherein the first optical signal is a wavelength division multiplexed optical signal.

10. The O-band optical communication system of claim 7, wherein the transmitter generates the first optical signal at a wavelength shorter than the first zero dispersion wavelength and generates a second optical signal at a wavelength longer than the first zero dispersion wavelength.

11. The O-band optical communication system of claim 5, wherein the first and second fiber segments form a first optical path between the input and the output, and the optical fiber system further comprises at least a third optical fiber segment coupled in series to a fourth optical fiber segment so that a second optical signal propagating from the input of the optical fiber system to the output of the optical fiber system passes through both the third fiber segment and the fourth fiber segment along a second optical path.

12. The O-band communication system of claim 11, wherein the third fiber segment has a positive dispersion-wavelength gradient and a third zero dispersion wavelength in the range 1295 nm-1330 nm and the fourth fiber segment has a negative dispersion-wavelength gradient and a fourth zero dispersion wavelength in the range 1295 nm-1330 nm, different from the third zero dispersion wavelength.

13. The O-band optical communication system of claim 11, further comprising a transmitter capable of generating the first optical signal, the transmitter being coupled to the input of the optical fiber system so that the first optical signal propagates along the first optical path of the optical fiber system.

14. The O-band optical communication system of claim 13, wherein the transmitter is capable of generating the second optical signal, the transmitter being coupled to the input of the optical fiber system so that the second optical signal propagates along the second optical path of the optical fiber system.

15. The O-band optical communication system of claim 13, further comprising an optical receiver capable of receiving the first optical signal, the optical receiver being coupled to the output of the optical fiber system so that the first optical signal propagates from the output of the optical fiber system to the optical receiver.

16. The O-band optical communication system of claim 15, wherein the optical receiver is coupled to the output of the optical fiber system so that the second optical signal propagates from the output of the optical fiber system to the optical receiver.

* * * * *

UNITED STATES PATENT AND TRADEMARK OFFICE
CERTIFICATE OF CORRECTION

| | | |
|---|---|---|
| PATENT NO. | : 11,329,723 B2 | |
| APPLICATION NO. | : 17/078921 | |
| DATED | : May 10, 2022 | |
| INVENTOR(S) | : Parsons et al. | |

It is certified that error appears in the above-identified patent and that said Letters Patent is hereby corrected as shown below:

In the Claims

Column 19, Line 8, Claim 12: "O-band communication system" should read --O-band optical communication system--

Signed and Sealed this
Eleventh Day of October, 2022

*Katherine Kelly Vidal*

Katherine Kelly Vidal
*Director of the United States Patent and Trademark Office*